Figure 1:
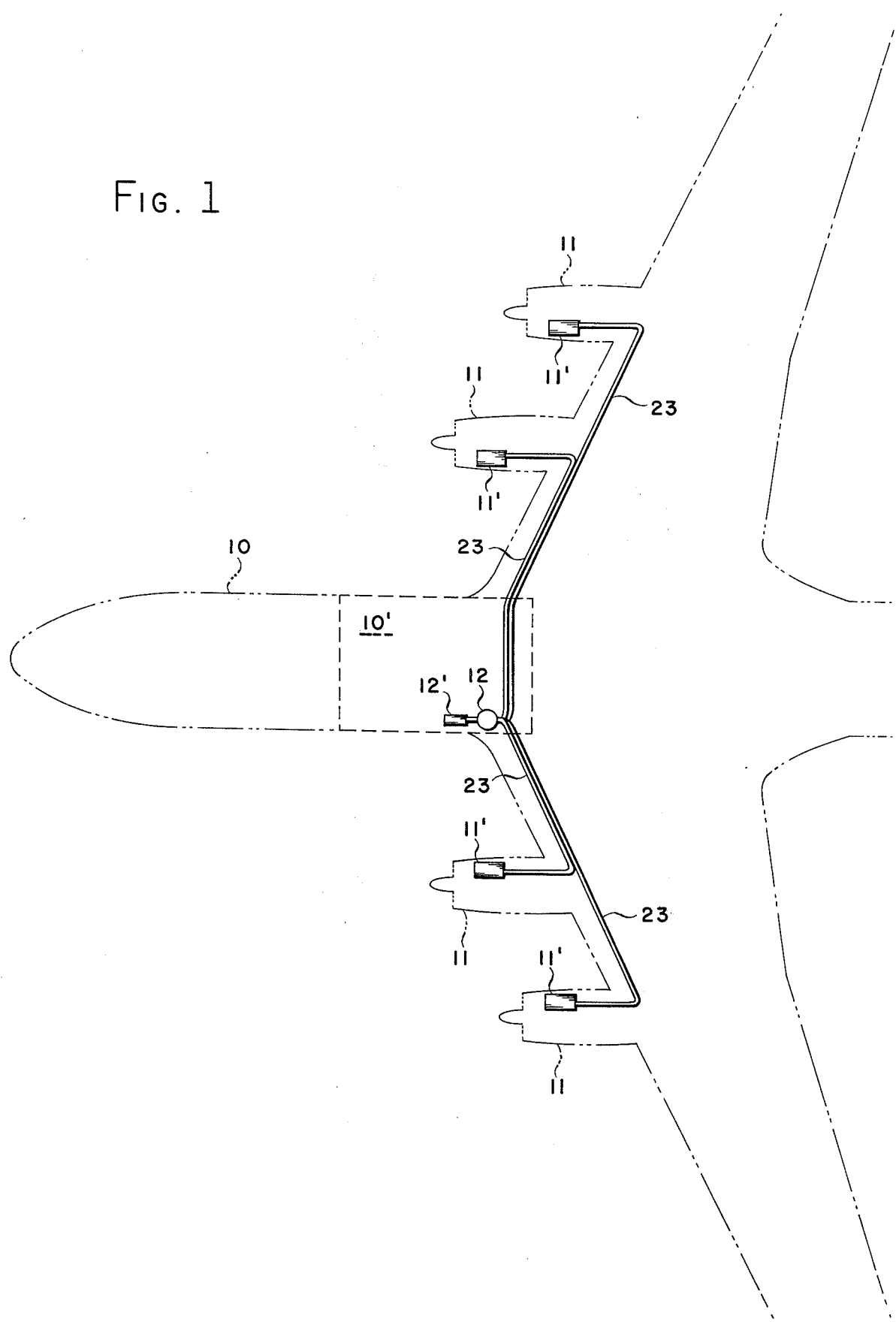

United States Patent [19]

Ligler

[11] 4,012,012
[45] Mar. 15, 1977

[54] SUPPLEMENTAL OIL SYSTEM FOR ENGINES

[75] Inventor: George E. Ligler, Atlanta, Ga.

[73] Assignee: Lockheed Aircraft Corporation, Burbank, Calif.

[22] Filed: Oct. 30, 1975

[21] Appl. No.: 627,123

[52] U.S. Cl. .......................... 244/1 R; 123/196 S; 184/6.3; 244/129.1; 244/135 C

[51] Int. Cl.² .................................. B64D 33/00

[58] Field of Search ............. 244/1 R, 17.13, 65, 244/53 R, 55, 57, 129 R, 135 C; 123/196 S, 196 CP; 137/386, 390, 412, 625.11; 184/6.4, 6.3, 103 R, 105 R; 91/1; 92/5

[56] References Cited

UNITED STATES PATENTS

| | | | |
|---|---|---|---|
| 2,509,426 | 5/1950 | Fransen | 184/105 R |
| 2,557,438 | 6/1951 | Johnson | 137/412 |
| 2,617,495 | 11/1952 | Johnson | 184/103 R |
| 3,052,317 | 9/1962 | Leach | 184/6.3 |
| 3,076,478 | 2/1963 | Winders | 137/625.11 |
| 3,096,043 | 7/1963 | Labussiere | 244/65 |
| 3,096,788 | 7/1963 | Talbot et al. | 137/625.11 |
| 3,500,962 | 3/1970 | Kocher | 184/103 R |
| 3,838,624 | 10/1974 | Mita et al. | 91/1 |
| 3,876,037 | 4/1975 | Rath | 184/6.4 |

FOREIGN PATENTS OR APPLICATIONS 1,506,114 6/1969 Germany .................. 244/17.13

Primary Examiner—Trygve M. Blix
Assistant Examiner—Galen L. Barefoot
Attorney, Agent, or Firm—Billy G. Corber; John J. Sullivan

[57] ABSTRACT

An oil replenishment system provides a remote reserve oil tank and the plumbing necessary to fill the main oil tank or tanks of engines, especially aircraft engines during flight. This system includes apparatus to determine the quantity of oil pumped to any one engine so that a quantity gauge is not required on the engine. A selector valve located on the reserve tank which may be remotely controlled directs replenishment oil to the selected engine tank. The system is designed to be powered from the existing on board hydraulic power system.

6 Claims, 2 Drawing Figures

SUPPLEMENTAL OIL SYSTEM FOR ENGINES

This invention relates to engine oil systems and more particularly to a supplemental oil system to allow the engine oil in a main system to be replenished in measured quantities during operation of the engine and to permit the main oil tank or tanks of vehicles to be topped without external and/or stationary, surface equipment.

Engine lubricating systems in aircraft, for example, are designed and constructed to the airplane performance, i.e., sized to the requirements of the mission for which the airplane is built. Thus, the capacity of the oil tank or tanks is such as to assure adequate lubrication of the engine over its intended period of operation.

The basic philosophy of determining the quantity of oil to be carried in an engine oil tank is to determine the maximum oil consumption allowable for the engine in a time period and then establish the maximum flying time anticipated for the engine in a single flight. The rate of consumption is then multiplied by the flying time to arrive at the quantity of usable oil in an engine oil tank. This quantity normally determines the physical size of the tank.

Subsequent to the design, manufacture and installation of the tank in the airplane if, for example, additional flying time is required there are two choices: first, increase the size of the tank or second, provide a remote supply to the tank that can be used during the operation of the engine. Increasing the tank size usually introduces problems such as qualification, space, etc., which renders this approach unsatisfactory and makes the remote supplemental supply concept more attractive.

However, many aircraft engine tanks have only a low level oil warning so that a supplemental oil supply should include means permitting a specific metered quantity of oil to be added to the active tank in increments as required. This is desirable even where the active tank includes a linear quantity gauge since it allows the crew to divert their attention during the resupply operation without fear of over filling.

The prior art includes various schemes and systems for resupplying engines with oil. These devices are for the most part for automotive type wet sump engines using unpressurized sumps. These systems are not adapted for use in active pressurized dry sump type aircraft engines. Such prior art systems as are employed in aircraft are gravity fed with floats or overflow pipes to control the oil level and/or a single shot system. These single shot systems are used when oil is consumed on a programmed level, typically a lift jet engine where the weight of a dry sump oil system and reservoirs cannot be used. They cannot be classified as a reserve make up system in the true sense.

The supplemental oil system herein proposed fills needs in the performance and operations of aircraft not satisfied by the existing state of the art. For example, in the modification of in-service airplanes to increase their mission capabilities these airplanes are "stretched", i.e., the fuselage is split transversely and one or more sections or "plugs" as they are called are inserted. The ultimate length of the fuselage is thereby increased with a volumetric gain of as much as twenty-five percent for added cargo and/or passengers. This results in appreciable changes in aircraft performance, notably range, speed and the like. The oil requirements for each engine of the stretched airplane become substantially greater than for the original airplane if its operational efficiency is to be maintained.

In essence, the present invention contemplates, among other things, a supplemental oil supply system adapted to be incorporated into the airplane. This supplemental system includes a reserve tank, a feed line from such reserve tank to each main engine oil tank and valving in this feed line to direct oil in predetermined, metered amounts from the reserve tank to a selected one of the main tanks. Preferably the reserve tank is located in an area of the airplane which is accessible to the operators or crew members.

Figure 2:
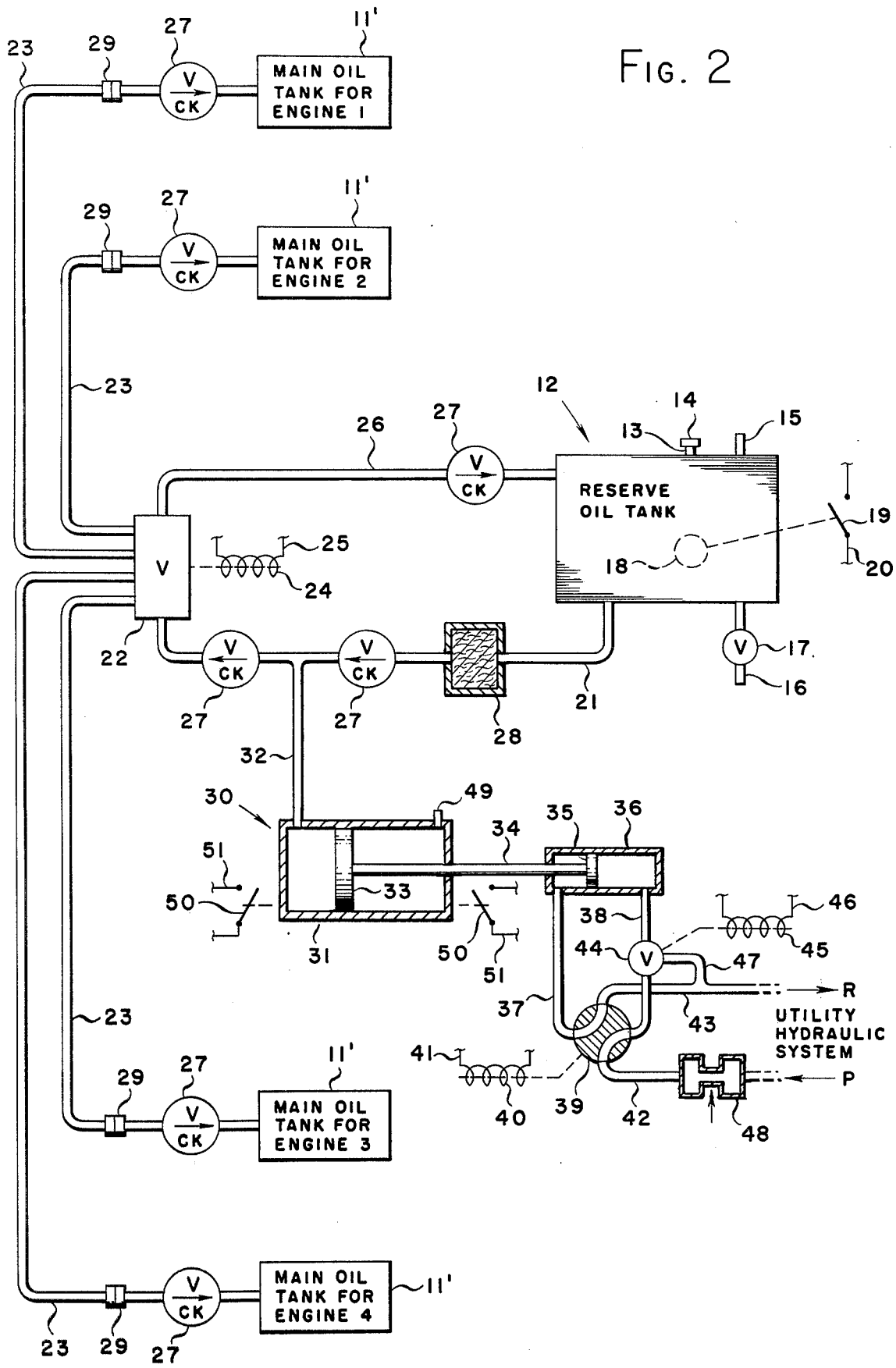

With the above and other objects in view as will be apparent this invention consists in the construction, combination and arrangement of parts all as hereinafter more clearly described, claimed and illustrated in the accompanying drawing wherein:

FIG. 1 is a plan view of an illustrative four engine airplane which has been stretched as indicated by broken lines transversely of the fuselage to show the general arrangement of a supplemental oil system as herein contemplated whereby replenishment of each main engine oil tank is accomplished; and FIG. 2 is a schematic of the supplemental oil system of FIG. 1 showing the reserve tank and plumbing details by which this reserve tank is operatively connected to the main oil tank of any of the four engines.

Referring more particularly to the drawing 10 designates a component of an airplane, for example, the fuselage having an insert or plug 10' installed in the length thereof as an integral part to increase the volumetric area of the airplane. For purposes of illustration this airplane has four turbo jet engines 11 each having a main oil tank 11' associated therewith in the typical manner of present day aircraft. For all intents and purposes each of the tanks 11' for engines 11, numbered 1 through 4, are identical one with the other, each being designed, constructed and intended to provide lubricating oil necessary for the operation of its associated engine 11.

Mounted within the fuselage 10 and preferably within the plug 10' is a reserve oil tank 12 and an operator's control panel 12' therefor. The tank 12 has a conventional filler neck 13 and closure cap 14 located so as to be readily accessible from the interior compartment or hold of the airplane. The tank 12 is vented as at 15 and may be emptied through a drain line 16 by operation of a valve 17. Oil level in the tank 12 is measured by appropriate means such as a float 18 and indicated preferably by activation of a switch 19 by the float 18 whereby such indication is transmitted through a conductor 20 connectable to a visual or audible indicator (not shown).

The reserve 12 is connected by a pipeline 21 through a distribution valve 22 to a selected one of the feedlines 23 leading to each of the main oil tanks 11' for the four engines 11. The valve 22 is actuated, for example, by a solenoid 24 remotely controlled at the panel 12' through a connector 25 to selectively establish communication between the pipeline 21 and any one of the feedlines 23 to the associated main oil tank 11' of the engines 11 No. 1 through 4. The valve 22 may also be actuated to operatively connect the pipeline 21 to a return line 26 to the reserve tank 12 which permits operational checking of the system as will become more apparent.

One way check valves 27 are operatively connected in the pipeline 21, each feedline 23 and return line 26, as required to prevent the reverse flow of oil to the reserve tank 12 and to allow the main engine system to operate at a different pressure than the dormant reserve system. If desired, a filter 28 may be employed in the pipeline 21 adjacent the reserve tank 12 to prevent contaminants from entering the main engine system. Also standard disconnects 29 are incorporated in each feedline 23 to permit removal and reinstallation of the associated engine 11 when desired.

A force pump 30 is operatively connected in the pipeline 21 to control the movement of oil from the reserve tank 12 through the selected feedline 23 or the return line 26. More specifically, the pump 30 comprises a cylinder 31 the interior of which is in communication with the pipeline 21 through a connecting line 32 extending from one end of the cylinder 31. Mounted for reciprocation in the cylinder 31 is a piston or plunger 33 driven by a rod 34 extending therefrom in the direction of the opposite end of the cylinder 31 and through the cylinder end wall where it terminates in a piston head 35 of a power cylinder 36.

The power cylinder or motor 36 is actuated by pressurized fluid directed against either side of the piston head 35 through lines 37 and 38. A two-way valve 39 which may be actuated by a solenoid 40 controlled at the panel 12′ through a connector 41, selectively connects either one of the lines 37 or 38 to a suitable pressure source P through line 42 and the other line 37 or 38 to return R through line 43.

A separate three-way valve 44 is operatively connected in the line 38 for controlled actuation by a solenoid 45 operable at the panel 12′ through a connector 46. Thus, a neutral position of the motor 36 may be affected by operation of the valve 44 to connect line 38 to a spur line 47 in communication with the return line 43. In its other two operations the valve 44 either connects the pressure line 42 to the motor 36 or disconnects the pressure line 42 from the motor 36 while connecting line 38 to return line 43 through the valve 39. If desired a fluid flow control 48 in the form of an adjustable orifice adapted to be pre-set may be incorporated in the pressure line to the valve 39 to establish a minimum time to cycle.

The pump or cylinder 31 is sized to a predetermined capacity or volume, for example, 1 quart, i.e., to give a discharge of 1 quart of oil with each full stroke of the piston 33. Thus, as the piston 33 is moved to the extreme right (FIG. 2) of the cylinder 31 by operation of the motor 36 1 quart of oil from the reserve tank 12 is allowed to flow or is drawn into and fills the cylinder 31. Upon actuation of the valve 39 pressurized fluid from the source is directed to the right side of piston head 35 forcing it and piston 33 to move to the left. The 1 quart of oil in the cylinder 31 is thereby discharged through line 32, line 21 and valve 22 into the selected line 23 or return line 26.

Actuation of the valve 39 at this time so as to connect pressurized fluid to the other side or left of piston head 35 drives the piston 33 back to the right end of the cylinder 31. This allows refilling of the cylinder 31 with oil from the reserve tank 12. Trapped air in the cylinder 31 is removed through a vent 49 provided for this purpose in the adjacent end of the cylinder 31. Also, if desired, a contact switch 50 may be provided at each end of the cylinder 31 for actuation by the piston 33 for transmission of a signal through an associated connector 51 to the panel 12′ or an appropriate station where the position of the piston 33 is indicated accordingly.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. The combination with an airplane having a wing with multiple turbo-jet engines and each having an associated main oil tank mounted thereon, of a supplemental oil system to replenish oil in each main oil tank, said system comprising:
    a reserve tank of oil located internally of said airplane;
    a pipeline connecting said reserve tank to each said main tank;
    a container having a measured capacity less than that of said reserve tank located in said pipeline;
    valving in said pipeline operable to permit the flow of oil from said reserve tank to said container and a distribution valve to control the flow of oil from said container to a selected one of said main tanks; and
    a force pump to assure the flow of oil from said reserve tank to said container and to each said main tank when free to do so upon the operation of said valving.

2. The supplemental oil system of claim 1 wherein said reserve tank has a filler opening accessible from the interior of said airplane.

3. The supplemental oil system of claim 1 including a control panel located proximate said reserve tank and connections between said panel and said valving for the operation of the latter from the former.

4. The supplemental oil system of claim 1 wherein said container is a cylinder and said force pump is a piston operable in said cylinder under the power of a reciprocating differential motor.

5. The supplemental oil system of claim 4 wherein said reciprocating differential motor is a hydraulic cylinder controlled by valve means located between it and a source of fluid pressure.

6. The supplemental oil system of claim 4 including a signal generating contact at opposite ends of said cylinder engageable by said piston to thereby indicate the location of said piston at each cylinder end.

* * * * *